Figure 1:
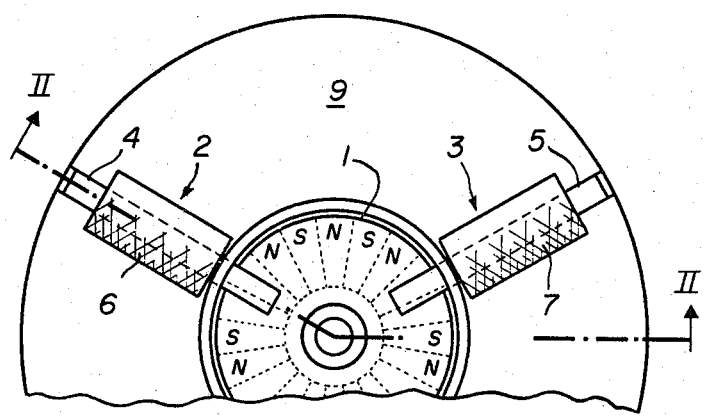

United States Patent [19]

Oudet

[11] 4,387,312
[45] Jun. 7, 1983

[54] STEPPING POLYPHASED MOTOR FOR A CLOCKWORK MECHANISM

[75] Inventor: Claude Oudet, Besançon, France

[73] Assignee: Portescap, La Chaux-De-Fonds, Switzerland

[21] Appl. No.: 220,055

[22] PCT Filed: Apr. 9, 1980

[86] PCT No.: PCT/CH80/00044

§ 371 Date: Dec. 12, 1980

§ 102(e) Date: Dec. 12, 1980

[87] PCT Pub. No.: WO80/02203

PCT Pub. Date: Oct. 16, 1980

[30] Foreign Application Priority Data

Apr. 12, 1979 [CH] Switzerland .......................... 3507/79

[51] Int. Cl.³ ............................................. H02K 37/00
[52] U.S. Cl. .................................. 310/49 R; 310/268

[58] Field of Search .......... 310/156, 268, 49, 162–164, 310/112

[56] References Cited

U.S. PATENT DOCUMENTS 3,803,433  4/1974  Ingenito ........................... 310/268 X Primary Examiner—Donovan F. Duggan
Attorney, Agent, or Firm—Cushman, Darby & Cushman

[57] ABSTRACT

A polyphased stepping motor for the direct driving of the second or minute pin in a clockwork. The motor comprises a disc shaped rotor (1) axially magnetized so as to have 2N alternating poles and at least two stator members (2, 3) each made by a magnetic circuit with gap and command coil (6, 7). The magnetic circuit is formed by one or two U-shaped members coupled with the said coil. The arrangement is such that the number of steps per command current period be 60 m/N. The invention also applies to motors for quartz clocks.

11 Claims, 9 Drawing Figures

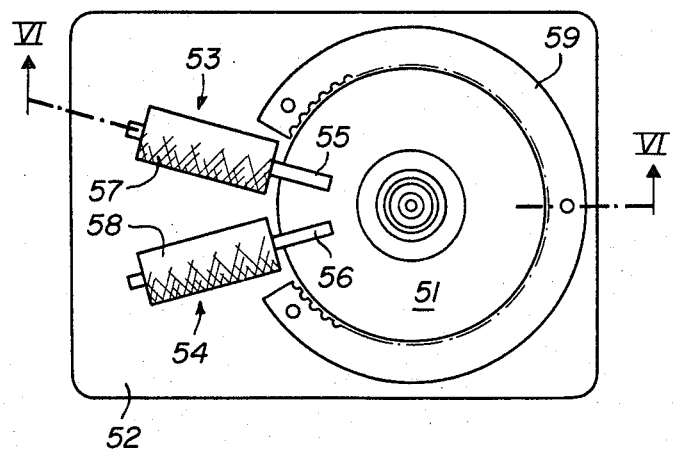
FIG. 5
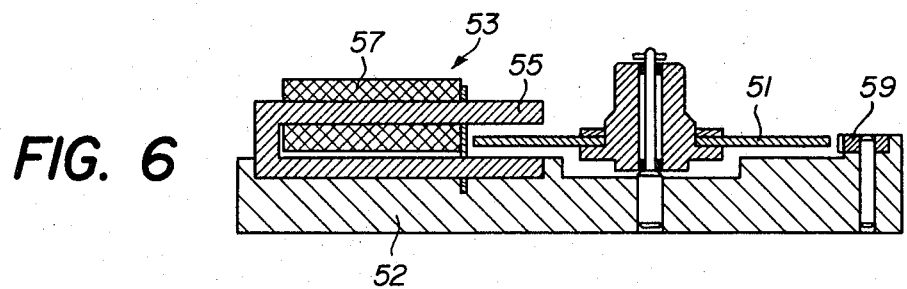
FIG. 6
FIG. 7
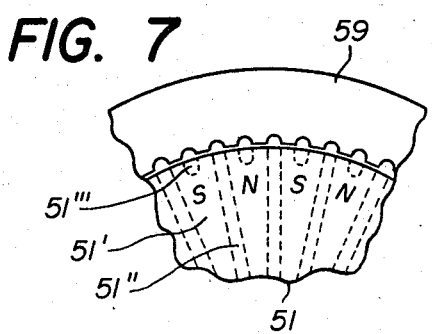
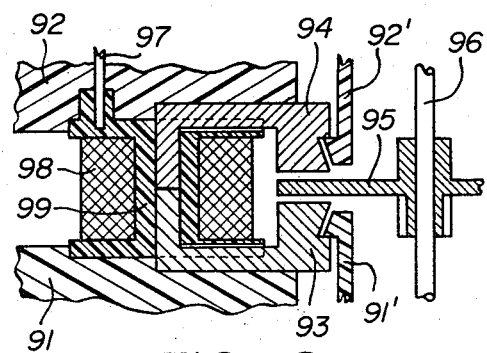
FIG. 9
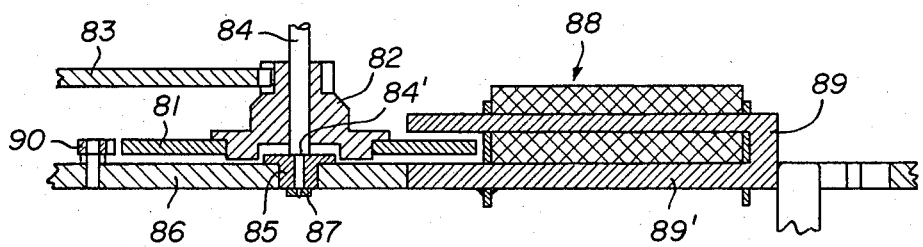
FIG. 8

STEPPING POLYPHASED MOTOR FOR A CLOCKWORK MECHANISM

The subject of the present invention is a polyphase stepping motor for direct driving of the seconds' or minutes' axis of a time piece movement, comprising a disc-shaped rotor which is magnetized so as to exhibit on at least one of its surfaces 2 N alternately positive and negative poles, and comprising at least two stator elements including each a magnetic circuit of magnetically permeable material with an air gap in which the rotor poles are moving, and including each at least one coil coupled with the magnetic circuit and fed by a periodic control current, the arrangement being such that the number of steps P made per control current period is 60 m/n, m=1, 2, 3, . . . .

In electronic time piece movements, in particular in quartz clocks, the noise generated by the intermediate movable parts between the rotor of the motor and the seconds' or minutes' axis and by the intermittent contacts between the teeth of the various gear pairs is comparatively loud and is a nuisance. It is therefore desired to have a motor capable of directly driving the seconds' or minutes' axis to provide a more silient mechanism.

The object of the present invention is therefore to provide a motor with m.60 steps per rotor turn, which is of a specially simple and reliable structure. The invention also aims to reduce the manufacturing cost of the motor taking into account, in particular, the required control circuit and the manufacturing margins in mass-production.

The attached drawing shows, by way of example, various embodiments of a stepping motor according to the invention, and the advantages and characteristic features of the invention will become clearly apparent from the description given hereafter with reference to these various embodiments.

Figure 2:
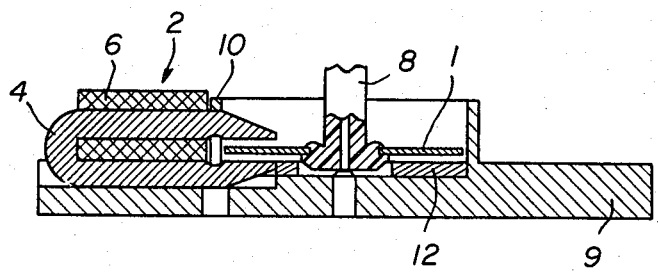
Figure 3:
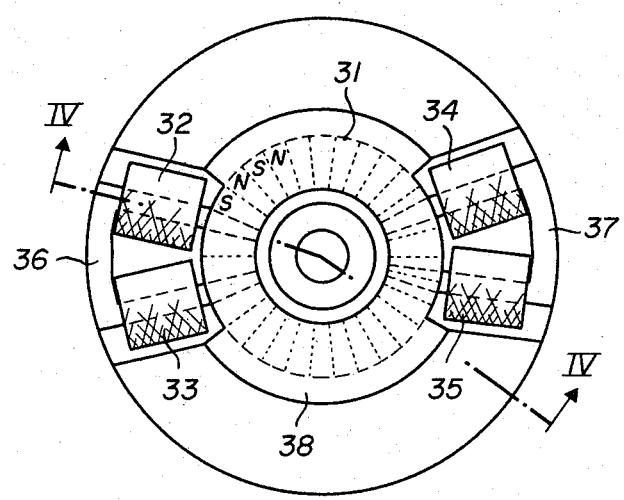
Figure 4:
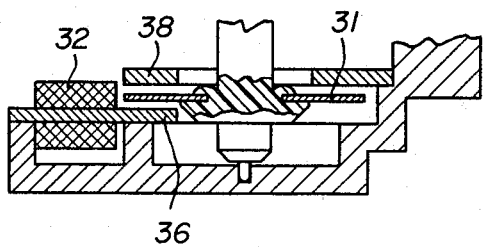

In the drawing:

FIG. 1 is a partial top view of a three-phase homopolar motor according to the invention, FIG. 2 is a section along broken line II—II of the motor of FIG. 1, FIG. 3 is a partial top view of a two-phase heteropolar motor according to the invention, FIG. 4 is a section along broken line IV—IV of the motor of FIG. 3, FIG. 5 is a top view of a two-phase homopolar motor according to the invention, FIG. 6 is a section alone broken line VI—VI of the motor of FIG. 5, FIG. 7 is a partial top view of the motor of FIG. 5 showing the magnetisation of the rotor, FIG. 8 is a sectional view similar to that of FIGS. 2 and 6 of an alternative embodiment of a homopolar polyphase motor according to the invention, and FIG. 9 is a partial sectional view of a motor according to the invention in which each stator element comprises two U-shaped parts.

The preferred embodiments described by way of example, are based on the following considerations. The realization of rotors in the form of multipolar magnets with N pairs of poles for use in time piece movements is in practice limited to maximum values of N=15. The polyphase control of the stator element coils allows to obtain P steps per electric period so that the motor makes N·P steps per turn. As the number of coils as well as the number of transistors of the output stage of the control circuit and its number of terminals is related to P, it is advantageous to make P small. Furthermore, when choosing a unipolar or bipolar control (pulses of same polarity or of alternating polarity) it is to be considered that bipolar controls require four transistors and two insulated wires per coil contrary to one transistor or even two transistors and one insulated wire per coil controlled by unipolar pulses. Under these circumstances, the preferred solution for a motor making 60 steps per complete revolution of the rotor are the following:

(1) P=4, N=15, two-phase motor, bipolar control
(2) P=4, N=15, two-phase motor, unipolar control with mid-point coils
(3) P=6, N=10, three-phase motor, unipolar control
(4) P=6, N=10, two-phase motor, with 120° phase-angle and bipolar control
(5) P=6, N=10, two-phase motor, with 120° phase-angle and unipolar control with mid-point coils.

It is to be noted that solutions 2, 3, and 5 require four, three and four transistors, respectively, without taking into account as much possible damping transistors to short-circuit the unfed coils on themselves. If damping transistors are used, solutions 1 and 4 are more advisable than solutions 2 and 5 which use only one half of a coil at a time, at an equal total number of transistors. It is also to be noted that with P=4 on a two-phase motor both coils can be fed simultaneously in the four states. Possible shifting errors of the two phases at $\pi/2$ electric angle are without effect on the angle run per step, as only the amplitude of the field vector is affected. On the other hand, in solutions 4 and 5, one phase, then both phases are controlled alternatively. These solutions are therefore sensitive to shifting errors which of course remain non-comulative.

In all solutions an essential advantage of the motors of the invention consists in the use of extremely simple stator elements having a magnetic circuit which can be made for instance as a single piece, as all elements are identic, so that the use of two or three elements becomes acceptable from an economic point of view.

The motor shown in FIGS. 1 and 2 comprises a disc-shaped rotor 1 which is axially magnetized to exhibit on each of its surfaces 2 N alternatively positive and negative poles. The dashed line parts designated by N and S represent the poles appearing on one surface of the multipolar magnet say in the present example N=10 pole pairs. FIG. 1 further shows two stator elements 2 and 3 comprising each a U-shaped part 4, 5 of highly permeable material, the free ends of which constitute the polar parts of the corresponding magnetic circuit. Coils 6, 7 are placed on each of the U-legs and are connected to a control circuit not shown.

The shaft 8 of the rotor and the stator elements are fixed onto a supporting part or plate 9, the U-shaped parts being capable of fitting into grooves of that plate and of being maintained by a ring 10 mould with the plate 9, the elasticity of the U-legs facilitating the mounting.

The shown stator elements are radially extending and placed in a position in which the rotor poles pass between the polar parts of these elements. In the case of the three-phase motor of the above mentioned solution 3 and in the case of a two-phase motor according to solution 5, the stator elements have an angular spacing of k. $2\pi/N + 2\pi/3$ N. FIG. 1 shows the case in which that angle is equal to 120°, the third stator element of a three-phase motor being not shown. In the case of the above mentioned solution 2 the angular distance between the stator elements is k. $2\pi/N + \pi/2$ N. In the foregoing, k is a whole number and the angular distance is defined by the angle formed between the median axial planes of the stator elements.

FIGS. 3 and 4 show a motor of the heteropolar type according to the invention. In this case the polar parts of the stator elements are arranged on the same side of the rotor disc 31 and cooperate with poles appearing on the surface of the magnet opposite these polar parts which, as shown in FIG. 3, preferably have the shape of the magnetized parts of the rotor. Two coils 32, 33 and 34, 35 are placed on corresponding legs of the U shaped parts 36, 37, two of which are shown in the example of FIG. 3. It will be noted that the configuration of the U-shaped parts is such that the coils can be placed successively on the U legs. The shifting of the polar parts of a stator element is $(2k+1) \pi/N$, k being generally a whole number. FIG. 3 shows the preferred solution $k=1$ which allows to dispose coils of a fairly large outer diameter while keeping the length of the magnetic circuit short.

To increase the efficiency of the magnets and to compensate the axial pressures, a flux-closing plate 38 of magnetically permeable material can be placed on the rotor side opposite the stator elements, the rotor being axially magnetized as previously.

It is also possible to place the magnet on a small disc of magnetically permeable material so as to obtain a flux-closing plate movable with the rotor. The efficiency of the magnets is thereby increased but also the axial forces acting on the rotor.

It is to be noted that the heteropolar variant of the motor is preferably used with a regular arrangement of the stator elements, for instance two substantially diametrically opposite elements for a two-phase motor or three elements shifted by 120° for a three-phase motor, when the axial forces are not compensated, so that the resulting force on the motor axis is a pure force which is compensated by the reaction of an axial stop, but not a force and a couple of forces.

In a motor of the type of FIG. 3 it is also possible to use an isotropic magnet the magnetization of which is festoon-shaped, i.e. that the poles appear only on one of the surfaces of the rotor disc. A fixed plate of permeable material placed between the polar parts of the stator elements can in this case be used to increase the efficiency of the magnet.

As it is difficult to obtain a magnet with entirely parallel faces and particularly to have a magnet of large diameter turn strictly in a plane, the preferred solution of the invention involves the use of a magnet with substantially straight demagnetization characteristic and a design of the magnetic circuit and of the rotor disc assuring that each magnet of the disc has a mean working point for which the product B·H is always substantially smaller than (B·H) max of the magnet. By mean working point is meant the average of the values B·H during the passage of the magnet near the polar parts of the stator. The use of such a sub-adapted magnet leads to an increased clearance between the rotor disc and the polar parts of the stator elements. The sub-adaption is also advantageous due to the fact that the angular shifting errors of the stator elements or the rotor errors result in a compensation of the double frequency static torques which theoretically can cancel each other perfectly in a polyphase motor. Such errors produce the effect that steps become inequal and the useful torque is reached. Furthermore, if it is desired to obtain a high torque for a given number of ampere-turns, it is necessary to increase the magnetic potential of the magnet for instance by chosing a magnet of higher energy; this makes the compensations more difficult.

For damping the motor, the short-circuiting of the coils over a saturated transistor may in some cases not be sufficient or it may not be desired when the surface of the integrated circuit is to be reduced by avoiding additional transistors. In this case, it is possible to arrange a copper plate such as plates 12 or 38 in FIGS. 1, 2 and 3, 4, respectively, either above, or below, or on both sides of the magnet. This allows to obtain damping by eddy currents. FIGS. 5, 6 and 7 show an advantageous embodiment in the form of a two-phase homopolar motor with $N=15$ pairs of poles and with two stator elements arranged in order to obtain minimum outer dimensions of the motor. The angle comprised by the axial planes constituting the median planes of the two stator elements is equal to 30° (corresponding to $k=1$ in the relationship mentioned above). The disc-shaped axially magnetized rotor 51 is rotatably mounted on a plate 52 bearing stator elements 53, 54 which comprise a U-shaped part 55, 56 of highly permeable material and a control coil 57, 58 placed around one leg of the corresponding U-shaped part.

Control coils 57, 58 are fed by pulses of alternating polarity the period of which corresponds to 1/15 of the rotation period of the rotor and which are shifted in phase from one coil to the other by 1/60 of the rotation period of the rotor. In the present case where $N=15$, 60 steps per complete revolution of the rotor are thus obtained.

The duration of the pulses can be substantially shorter than their period, for example it can be 7.8 msec for a period of 2 sec, when the equilibrium position of the rotor is maintained without current. To achieve this, the motor of FIG. 5 comprises a stationary toothed part 59, the teeth of which have a pitch corresponding to 60 teeth over the whole angle. Part 59 cooperates in the present example with the peripheral portion of the rotor 51 which is magnetized as shown in FIG. 7. In this figure, the magnetized parts of the rotor are delimited by dashed lines. It will be seen that the alternating positive and negative poles N and S have the shape of sectors 51' which are separated by radial unmagnetized zones 51". Furthermore, the peripheral part of each pole is divided into two portions by an unmagnetized part 51''' so as to provide opposite the teeth 59, 4 N auxiliary magnetized portions cooperating with the teeth 59 which have also an angular division of 360°/4 N. The cooperation of the auxiliary magnetized rotor portions with the teeth 59 provides a torque component acting on the rotor with a frequency which is four times as high as the basic frequency of the torque due to the control current, and defines the equilibrium positions of the rotor in the absence of current.

It is to be noted that a toothed part similar to part 59 can also be used in the other above mentioned embodiments. Thus, in the heteropolar structure of FIG. 3, plate 38 can be realized as a flux-closing plate, i.e. of magnetically permeable material, and have 60 teeth in the region placed opposite the circumference of the rotor. In the three-phase structure with unipolar control according to FIG. 1, 60 teeth per whole angle can also be provided in one or more parts for cooperation with the peripheral part of the rotor. The latter is for that purpose arranged similarly as shown in FIG. 7 but so as to exhibit in its peripheral part auxiliary magnetized portions having the width of the teeth of the stationary toothed part 59. This can be obtained by dividing into three each pole on the periphery of the rotor by means of two spaced unmagnetized zones such as 51''', or by one unmagnetized zone the width of which is such that two magnetized zones appear along the periphery of the rotor in each sector 51'. It can also be noted that in the solution of the three-phase motor with unipolar control and N=10, not only the components of the residual torque of twice the frequency of the basic frequency of the torque due to the current are eliminated, but also the components of the residual torque of the basic frequency which may result in particular from deficiencies in the rare-earth magnets which are preferably used in the present motors.

FIG. 8 is a sectional view similar to that of FIGS. 2 or 6 for instance, showing a preferred realization of the mounting of the rotor specially in the case of homopolar motor. The rotor disc 81 is integral with a central supporting part 82 which constitutes here also the pinion for driving a wheel 83 and is mounted on an axis 84 being for instance the seconds' axis of the time piece movement. Axis 84 is mounted in a bearing 85 driven in a plate 86 comprising the integrated control circuit of the motor. Axis 84 has a first stop portion 84' and bears on its free end a second stop part 87, for example in the form of a ring driven on that end. The axial portion of the rotor is entirely defined with respect to the supporting part by means of stops 84', 87. Stator elements such as 88 comprising a U-shaped part 89 are arranged in a well defined position with respect to plate 86. To this effect, plate 86 comprises a groove in which one of the legs 89' of the U-shaped stator part is fitted. Such an arrangement allows in practice to eliminate any difference in the position of the rotor with respect to the polar parts of the stator elements.

This is particularly important considering the small dimensions of these parts. For example, the distance between the polar parts of a stator element can be 1.6 mm, the thickness of disc 81 can be 0.7 mm for a diameter of 20 mm. Of course, axis 84 is guided laterally by a second bearing not shown in the drawing.

FIG. 8 also shows the arrangement of a toothed part 90 similar to part 59 of FIG. 5. It is to be noted that the position of this toothed part can be shifted for example by 10 to 20 electrical degrees with respect to the stable equilibrium position obtained by the only action of the torque due to the current. However, this does not have an effect on the direction of rotation of the motor which is related to the direction of rotation of the rotating field, i.e. to the order of arrival of the control signals at the coils. To reverse the direction of rotation of the motor of FIG. 5, for instance, it is sufficient to interchange the wires of a single coil or to reverse the order of arrival of the signals in the electronic control circuit. It is further to be noted that the duration of the pulses can be minimized to save energy of the current source in particular in the case of a battery, by recovering the potential, kinetic and self-induction energies, since the minimum pulse duration is mainly determined by the inertia of the clock hands to be driven. The above mentioned toothed part 59 thus allows to define the equilibrium position, but its shifting, within the above mentioned limits, does not have great effect on the pulse duration.

FIG. 9 is a sectional view of a motor in which the stator elements each comprise two U-shaped parts 93, 94 and a coil 98 the axis of which extends parallely to the rotor axis. Coil 98 is wound on a carcase 99 which also serves to support electrical connexion conductors such as 97 by which feeding current is applied to the coil. The first legs of the two U-shaped parts define an air gap in which passes the peripheral part—magnetized as described previously—of a rotor disc 95 mounted on an axis 96. The second legs of the U-shaped parts constitute the core of coil 98, either as shown in FIG. 9, by being placed to have the ends thereof join, or by having each leg extend over the whole length of the core but its thickness being only one half of the core thickness so that an excellent magnetic joint is formed by overlapping.

The stator elements are arranged between two supporting parts, namely plate 91 and bridge 92, retaining hooks 91', 92' cooperate with the first legs of the U-shaped parts and can be mould with the respective supporting parts, so as to secure a minimum well-defined air-gap despite the possible plays which may occur in assembling the stator.

The assembling of the motor of FIG. 9 can take place by movement of parts only in a direction parallel to the rotor axis, for example in the following way:

First, the first U-shaped parts 93 are placed on plate 91, f.i. in slots provided in said plate, said parts getting caught by hooks such as 91'.

Then, the rotor 95 with its axis 96 is mounted on the corresponding supporting part and coils with their carcases such as 98, 99 are placed on the corresponding U-legs of parts 93, the carcase being possibly aligned by a corresponding slot in plate 91. Separately, the second U-shaped parts 94 are mounted on bridge 92, similarly to the first parts and the assembly 92 (92'), 94 is positioned with respect to the coils and the rotor, so as to complete the magnetic circuits.

Among the variations of the motor embodiments according to the invention, the version of a motor effecting 120 steps per full turn can be mentioned, which corresponds to a movement of the seconds' hand by jumps of half seconds or of the minutes' hand by jumps of half minutes. This can be obtained by a two-phase motor with a rotor having 15 pole pairs and being controlled so as to effect 8 steps per electrical period.

Since the polyphase control allows to effect a great number of steps by second and to obtain a reversal of the direction of movement by simple change of the order of arrival of the control signals, it is possible to realize a very fast electrical time setting in either direction.

It is also to be noted that in order to reduce the current consumption in the case where a feeding by pulses of limited duration is not used, the control coils can be fed through a capacitor connected in series with that coil. If the locking torque is due to the current, it is thus necessary that the time constant of the RC-circuit comprising the resistance R of the coil and the capacitance C of the capacitor, be sufficient for a considerable current to flow in the coil or coils being fed. It is also possible to use a capacitor providing a shorter time constant and to connect in this case in parallel to that capacitor a resistor allowing a minimum current to flow for producing the necessary locking torque. If magnetic current-less locking means of the equilibrium positions have been provided (stationary toothed parts and magnetized auxiliary zones of the rotor), it is possible to use a capacitor control without connecting a resistor in parallel. It is also possible to apply, for each change of state only a pulse which is much shorter than the duration of that state, but of a duration sufficient for obtaining a safe change of the mechanical state of the clock-hands. The locking of the steps can of course also be assured mechanically, for example by means of a jumper-spring device. Regarding the creation of auxiliary magnetized zones of the rotor circumference, obviously the unmagnetized peripheral zones can if necessary be obtained by cutting out those zones.

What is claimed is:

1. A polyphase stepping motor for direct driving of the seconds' or minutes' axis of a time piece movement, comprising a disc-shaped rotor which is magnetized so as to exhibit on at least one of its surfaces 2 N alternately positive and negative poles, where N is a whole number of 15 or less, and comprising at least two stator elements including each a magnetic circuit of magnetically permeable material with an air gap in which the rotor poles are moving, and including each at least one coil coupled with the magnetic circuit and fed by a periodic control current, the arrangement being such that the number of steps P made per control current period of 60 m/N, where m is a whole number.

2. A motor as claimed in claim 1, characterized in that the magnetic circuit is constituted by a single U-shaped part the ends of which form the polar parts cooperating with the rotor poles.

3. A motor as claimed in claim 1, characterized in that the magnetic circuit is constituted by two U-shaped parts arranged so that the ends of first U-legs belonging to respective ones of these parts, are placed opposite each other to form the said air-gap, and the corresponding second U-legs form the core of the said coil.

4. A motor as claimed in claim 1, characterized in that the magnetic rotor-disc is made of a hard magnetic material having a substantially straight demagnetization curve and in that the said magnetic circuits and the rotor disc are dimensioned such that each magnet of the disc has a mean working point such that the product B·H is always substantially smaller than (B·H) max for the magnet.

5. A motor as claimed in claim 2, characterized in that the two legs of U-shaped stator elements are arranged in a same plane parallel to that of the rotor-disc, the angular shifting of the polar parts being $(2k+1) \pi/N$, k being a whole number.

6. A motor according to claim 1, characterized in that the stator comprises parts of electrically conductive material arranged in the vicinity of the magnetized rotor-disc.

7. A motor according to claim 1, characterized in that it comprises a stationary toothed part of magnetically permeable material, the teeth of which are arranged opposite a concentric annular zone of the rotor and have a division of $2 \pi/60$ corresponding to 60 teeth over the complete angle, and in that the said annular zone of the rotor exhibits auxiliary magnetized portions, which are spaced in the direction of rotation and arranged in such a way that within an angle of rotation corresponding to one step of the rotor, the auxiliary magnetized portions which are opposite the stationary part are placed opposite the corresponding teeth of the latter.

8. A motor as claimed in claim 7 comprising a rotor the poles of which are each formed by a magnetization covering at least a part of a surface sector of the disc and extending to the circumference of the same, characterized in that the auxiliary magnetized portions are constituted by peripheral portions of the rotor poles separated by unmagnetized portions and in that the stationary toothed part is arranged in the plane of the rotor opposite the circumference of the same.

9. A two-phase motor as claimed in claim 7, characterized in that it comprises a rotor with N=15 pole parts, two stator elements having each a control coil fed by pulses of alternating polarity, shifted in phase from one coil to the other by a quarter of the period of the pulses applied to the coil, the pole parts of each stator element being arranged in an axial plane of the motor on either side of the rotor disc such that the axial plane of two stator elements are shifted angularly by $\pi/6$ and the said two stationary parts surrounding the rotor over at least a part of the circumference of the same.

10. A three-phase motor as claimed in claim 7, characterized in that it comprises a rotor with N=10 pole parts, three stator elements having each a control coil fed by unipolar pulses shifted in phase from one coil to the other by one third of the period of the pulses applied to the coil, the polar part of each stator element being arranged in an axial plane of the motor on either side of the rotor disc and the said stationary toothed part surrounding the rotor over at least a part of the circumference of the same.

11. A motor according to claim 1, characterized in that the rotor axis comprises two axial stops cooperating with a bearing which is an integral part of the supporting part of the stator elements.

* * * * *